(12) United States Patent
Jin

(10) Patent No.: US 9,053,128 B2
(45) Date of Patent: Jun. 9, 2015

(54) ASSERTION MANAGEMENT METHOD AND APPARATUS, AND REASONING APPARATUS INCLUDING THE ASSERTION MANAGEMENT APPARATUS

(75) Inventor: Weon-Il Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 13/484,393

(22) Filed: May 31, 2012

(65) Prior Publication Data

US 2013/0138701 A1 May 30, 2013

(30) Foreign Application Priority Data

Nov. 28, 2011 (KR) .................. 10-2011-0125380

(51) Int. Cl.
*G06F 17/30* (2006.01)
(52) U.S. Cl.
CPC .... *G06F 17/30286* (2013.01); *G06F 17/30734* (2013.01)
(58) Field of Classification Search
CPC ............... G06F 17/30734; G06F 17/30286
USPC .................................. 707/803, 999.101, 802
See application file for complete search history.

(56) References Cited

U.S. PATENT DOCUMENTS

| 7,921,065 B2 | 4/2011 | Kim et al. | |
| 2006/0036633 A1* | 2/2006 | Chong et al. | 707/101 |
| 2007/0271277 A1* | 11/2007 | Ivan et al. | 707/100 |
| 2008/0288595 A1* | 11/2008 | Liu et al. | 709/206 |
| 2009/0077021 A1 | 3/2009 | Jung et al. | |
| 2010/0036788 A1* | 2/2010 | Wu et al. | 706/47 |
| 2011/0082829 A1* | 4/2011 | Kolovski et al. | 706/55 |
| 2012/0278363 A1* | 11/2012 | Fang | 707/794 |

FOREIGN PATENT DOCUMENTS

| KR | 10-2008-0045823 A | 5/2008 |
| KR | 10-2008-0096859 A | 11/2008 |
| KR | 10-2011-0048651 A | 5/2011 |
| KR | 10-2011-0069950 A | 6/2011 |
| WO | WO 2011/055925 A2 | 5/2011 |
| WO | WO 2011/074728 A1 | 6/2011 |

OTHER PUBLICATIONS

Jun Fang et al., Documents Classification by Using Ontology Reasoning and Similarity Measure, 2010, IEEE, 1535-1539.*
Goutam Kumar Saha, Web Ontology Language (OWL) and Semantic Web, 2007, ACM, vol. 8, 1-24.*
Benjamin N. Grosof et al., Description Logic Programs: Combining Logic Programs with Description Logic, May 20-24, 2003, ACM, 48-57.*

* cited by examiner

*Primary Examiner* — Jean B Fleurantin
(74) *Attorney, Agent, or Firm* — NSIP Law

(57) ABSTRACT

An assertion management method includes collecting a SameAs assertion from a plurality of assertions; searching the plurality of assertions for any assertion having a first individual of the SameAs assertion as an instance; and creating a new assertion having a second individual of the SameAs assertion as an instance from each found assertion.

10 Claims, 4 Drawing Sheets

US 9,053,128 B2

ASSERTION MANAGEMENT METHOD AND APPARATUS, AND REASONING APPARATUS INCLUDING THE ASSERTION MANAGEMENT APPARATUS

CROSS-REFERENCE TO RELATED APPLICATIONS

This application claims the benefit under 35 USC 119(a) of Korean Patent Application No. 10-2011-0125380 filed on Nov. 28, 2011, the entire disclosure of which is incorporated herein by reference for all purposes.

BACKGROUND

1. Field

The following description relates to ontology-based reasoning.

2. Description of the Related Art

Ontology is a formal representation of a series of concepts and their relationships in a domain. The formal representation is used for making deductions about the region, and can be used to define the domain.

For ontology-based reasoning, an assertion management apparatus, such as an ABox, which stores real-world facts as assertions, and an axiom management apparatus, such as a TBox, which stores real-world facts as axioms, are needed, and a reasoner performs reasoning using the assertions and axioms. By increasing the number of assertions and axioms and simplifying their formats, reasoning performance can be improved.

SUMMARY

According to an aspect, an assertion management method includes collecting a SameAs assertion from a plurality of assertions; searching the plurality of assertions for any assertion having a first individual of the SameAs assertion as an instance; and creating a new assertion having a second individual of the SameAs assertion as an instance based on each assertion found in the search.

The assertion management method may further include adding each new assertion to the plurality of assertions.

The creating of a new assertion may include substituting the second individual of the SameAs assertion for the first individual of each assertion found in the search.

Each new assertion may be a Class assertion, or an ObjectProperty assertion, or a DatatypeProperty assertion.

According to an aspect, an assertion management apparatus includes a collector configured to collect a SameAs assertion from a plurality of assertions; a search unit configured to search the plurality of assertions for any assertion having a first individual of the SameAs assertion as an instance; and a creator configured to create a new assertion having a second individual of the SameAs assertion as an instance based on each assertion found in the search.

The assertion management apparatus may further include an adder configured to add each new assertion to the plurality of assertions.

The creator may be further configured to create each new assertion by substituting the second individual of the SameAs assertion for the first individual of each assertion found in the search.

Each new assertion maybe a Class assertion, or an ObjectProperty assertion, or a DatatypeProperty assertion.

According to an aspect, a reasoning apparatus includes an ABox including a plurality of assertions, the ABox being configured to collect a SameAs assertion from the plurality of assertions; search the plurality of assertions for any assertion having a first individual of the SameAs assertion as an instance; create a new assertion having a second individual of the SameAs assertion as an instance based on each assertion found in the search; and add each new assertion to the plurality of assertions; and a reasoner configured to receive at least one assertion from the ABox; and perform reasoning using the at least one assertion received from the ABox.

The ABox may be further configured to create each new assertion by substituting the second individual of the SameAs assertion for the first individual of each assertion found in the search.

Each new assertion may be a Class assertion, or an ObjectProperty assertion, or a DatatypeProperty assertion.

According to an aspect, an assertion management method includes searching a plurality of assertions for a SameAs assertion having two individuals as instances; and creating at least one new assertion having one of the two individuals as an instance from the SameAs assertion and the plurality of assertions.

The creating of at least one new assertion may include searching the plurality of assertions for any assertion having one of the two individuals of the SameAs assertion as an instance; and creating a new assertion having another one of the two individuals of the SameAs assertion as an instance from each assertion having the one individual of the SameAs assertion as an instance found in the search.

The creating of a new assertion may include substituting the other individual of the SameAs assertion for the one individual of each assertion having the one individual of the SameAs assertion as an instance found in the search.

The SameAs assertion may have a format of one individual=another individual.

The assertion management method of claim 12 may further include adding the at least one new assertion to the plurality of assertions.

Each new assertion may be a Class assertion, or an ObjectProperty assertion, or a DatatypeProperty assertion.

The at least one new assertion may include a plurality of new assertions, each of which may be any one of a Class assertion, an ObjectProperty assertion, and a DatatypeProperty assertion, such that the plurality of new assertions may include only Class assertions; or only ObjectProperty assertions; or only DatatypeProperty assertions; or only at least one Class assertion and at least one ObjectProperty assertion; or only at least one Class assertion and at least one DatatypeProperty assertion; or only at least one ObjectProperty assertion and at least one DatatypeProperty assertion; or at least one Class assertion, at least one ObjectProperty assertion, and at least one DatatypeProperty assertion.

Other features and aspects will be apparent from the following detailed description, the drawings, and the claims.

DETAILED DESCRIPTION

Figure 1:
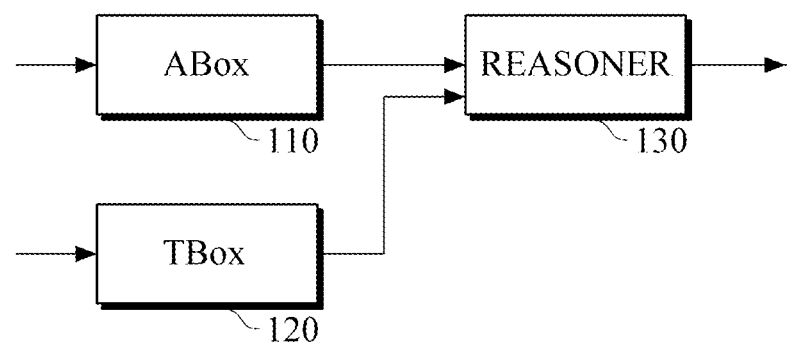
FIG. 1 is a diagram illustrating an example of a reasoning apparatus.

The following description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. Also, descriptions of well-known functions and constructions may be omitted for increased clarity and conciseness.

Throughout the drawings and the detailed description, the same reference numerals refer to the same elements. The relative size and depiction of these elements may be exaggerated for clarity, illustration, and convenience.

FIG. 1 is a diagram illustrating an example of a reasoning apparatus. The reasoning apparatus includes an ABox 110, a TBox 120, and a reasoner 130.

The ABox 110 stores assertions and the TBox 120 stores axioms. The term "reasoning" refers to a behavior for reaching a conclusion based on already-known facts, such as assertions and axioms, i.e., a process of logical deduction. The reasoner 130 receives assertions from the ABox 110 and axioms from the TBox 120, and performs reasoning based on the assertions an axioms. ABoxes, TBoxes, and reasoners in general are well known in the art, and thus will not be described in detail herein.

However, the ABox 110 of this example performs additional functions that are not included in the functions of a conventional ABox. For example, the ABox 110 searches for SameAs assertions in a plurality of assertions of the ABox 110, processes other assertions of the ABox 110 based on the SameAs assertions to create new assertions, and adds the new assertions to the ABox 110.

In greater detail, the ABox 110 collects a SameAs assertion from a plurality of assertions of the ABox 110, searches the plurality of assertions of the ABox 110 for assertions each having a first individual of the SameAs assertion as an instance, and then creates new assertions each having a second individual of the SameAs assertion as an instance from the found assertions. That is, the ABox 110 substitutes the second individual of the SameAs assertion for the first individual of the found assertions to create new assertions each having the second individual of the SameAs assertion as an instance, and adds the new assertions to the ABox 110. The new assertions may include a Class assertion, or an ObjectProperty assertion, or a DatatypeProperty assertion, or any combination thereof.

The first individual and the second individual are arguments of the SameAs assertion, and an instance is a member of a class. For example, in a SameAs assertion "a=b", "a" and "b" are individuals. Also, for example, "human" is a class, and "Hong Gil-dong" is an instance of the class "human".

A property is a binary relation that expresses a relationship between two individuals (an ObjectProperty), or between an individual and a data value (a DatatypeProperty). An example of an ObjectProperty is "hasChild(x, y)", and an example of a DatatypeProperty is "hasValue(y, 1)".

Figure 2:
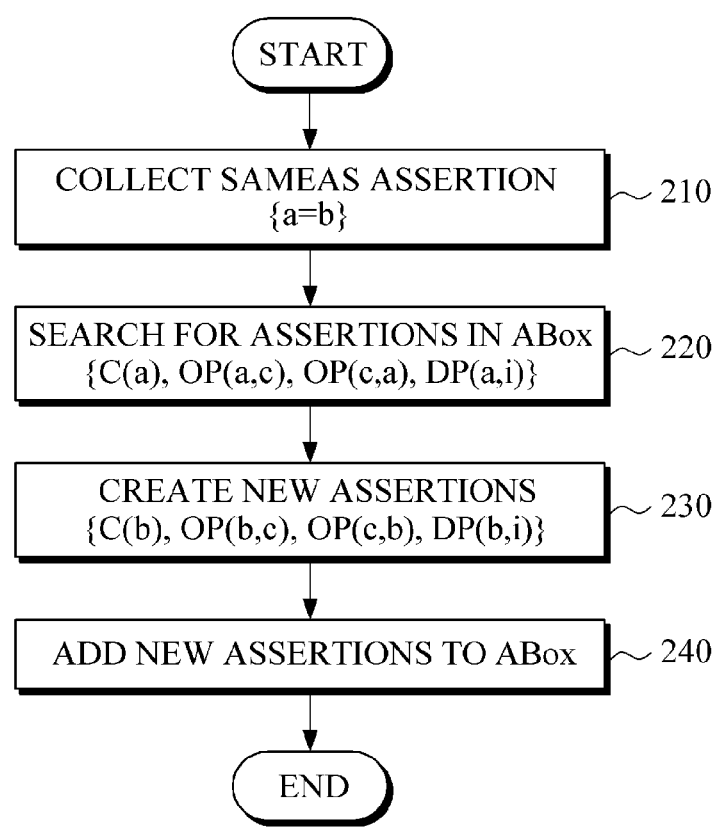
FIG. 2 is a flowchart illustrating an example of an assertion management method.

FIG. 2 is a flowchart illustrating an example of an assertion management method. First, SameAs assertions are collected (210). For example, a plurality of assertions that may be included in an ABox for ontology-based reasoning are searched for SameAs assertions. It will be assumed that a SameAs assertion "a=b" has been found, wherein "a" and "b" are individuals. Then, the plurality of assertions are searched for assertions each having the first individual "a" of the SameAs assertion as an instance (220). The found assertions include, for example, a Class assertion C(a), ObjectProperty assertions OP(a, c) and OP(c, a), and a DatatypeProperty assertion DP(a, i).

Then, new assertions each having the second individual of the SameAs assertion as an instance are created based on the assertions found in 220 (230). That is, by substituting the second individual "b" of the SameAs assertion for the first individual "a" of the found assertions, new assertions each having the second individual "b" of the SameAs assertion as an instance are created. In this example, new assertions including a Class assertion C(b), ObjectProperty assertions OP(b, c) and OP(c, b), and a DatatypeProperty assertion DP(b, i) are created. Finally, the new assertions are added to the ABox (240).

The assertion management method described above may be performed by an ABox for ontology-based reasoning, such as the ABox 110 described above.

Figure 3:
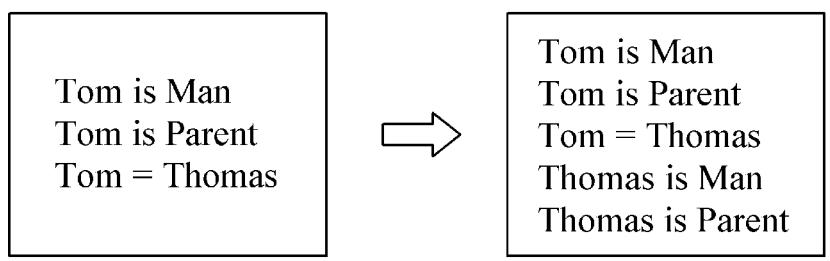
FIG. 3 shows examples of new assertions created by the assertion management method.

FIG. 3 shows examples of new assertions created by the assertion management method described above. As shown in FIG. 3, assuming that there are three assertions "Tom is Man", "Tom is Parent", and "Tom=Thomas", first, the three assertions are searched for a SameAs assertion. In this example, a SameAs assertion "Tom=Thomas" is found. Then, the three assertions are searched for assertions having the first individual "Tom" of the SameAs assertion as an instance. The found assertions are "Tom is Man" and "Tom is Parent".

Next, the second individual "Thomas" of the SameAs assertion is substituted for the first individual "Tom" of the found assertions, thereby creating new assertions "Thomas is Man" and "Thomas is Parent". Then, the new assertions "Thomas is Man" and "Thomas is Parent" are added to the three assertions.

Figure 4:
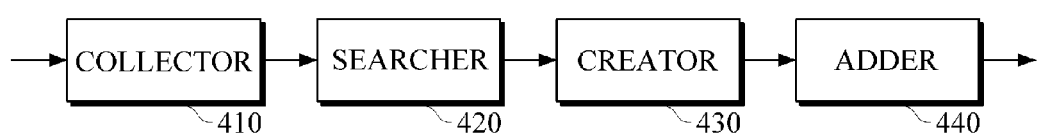
FIG. 4 is a block diagram illustrating an example of an assertion management apparatus.

FIG. 4 is a block diagram illustrating an example of an assertion management apparatus, which may be an ABox for ontological-based reasoning, such as the ABox 110 described above. Referring to FIG. 4, the assertion management apparatus includes a collector 410, a searcher 420, a creator 430, and an adder 440. The collector 410 collects a SameAs assertion from a plurality of assertions. The searcher 420 searches the plurality of assertions for assertions each having the first individual of the SameAs assertion as an instance. Then, the creator 430 creates new assertions each having the second individual of the SameAs assertion as an instance from the assertions found by the searcher 420.

In greater detail, by substituting the second individual of the SameAs assertion for the first individual of the found assertions, new assertions each having the second individual of the SameAs assertion as an instance are created. The new assertions may include a Class assertion, or an ObjectProperty assertion, or a DatatypeProperty assertion, or any combination thereof. Then, the adder 440 adds the new assertions to the plurality of assertions.

Therefore, according to the examples described above, it is possible to reduce a reasoning time of an ontology-based reasoning engine in context-aware technology and enhance the accuracy of the reasoning results. In other words, by analyzing SameAs assertions of an ABox for ontology-based reasoning in advance and reflecting the results of the analysis in new assertions in the ABox, the reasoning performance of the ontology-based reasoning may be improved.

The ABox 110, the TBox 120, and the reasoner 130 in FIG. 1 and the collector 410, the searcher 420, the creator 430, and the adder 440 in FIG. 4 may be implemented using hardware components and/or software components. Software components may be implemented by a processing device, which may be implemented using one or more general-purpose or special-purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purposes of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

As used herein, a processing device configured to implement a function A includes a processor programmed to run specific software. In addition, a processing device configured to implement a function A, a function B, and a function C may include configurations, such as, for example, a processor configured to implement functions A, B, and C; a first processor configured to implement function A and a second processor configured to implement functions B and C; a first processor configured to implement functions A and B and a second processor configured to implement function C; a first processor to implement function A, a second processor configured to implement function B, and a third processor configured to implement function C; a first processor configured to implement functions A, B, C and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion.

In particular, the software and data may be stored by one or more non-transitory computer-readable storage mediums. The non-transitory computer-readable storage medium may include any data storage device that can store data that can be thereafter read by a computer system or processing device. Examples of a non-transitory computer-readable storage medium include read-only memory (ROM), random-access memory (RAM), CD-ROMs, magnetic tapes, floppy disks, and optical data storage devices. Also, functional programs, codes, and code segments for implementing the examples disclosed herein can be easily constructed by programmers skilled in the art to which the examples pertain based on the drawings and their corresponding descriptions as provided herein.

While this disclosure has been particularly shown and described with reference to examples thereof, it will be understood by those skilled in the art that various changes in form and details may be made in these examples without departing from the spirit and scope of the invention as defined by the claims and their equivalents. It should be understood that the examples described herein should be considered in a descriptive sense only, and not for purposes of limitation. Descriptions of features or aspects in each example are to be considered as being applicable to similar features or aspects in other examples. Suitable example, suitable results may be achieved if the described techniques are performed in a different order and/or if components in a described system, architecture, device, or circuit are combined in a different manner and/or replaced or supplemented by other components or their equivalents. Therefore, the scope of the invention is defined not by the detailed description of the disclosure, but by the claims and their equivalents, and all variations within the scope of the claims and their equivalents are to be construed as being included in the invention.

What is claimed is:

1. An assertion management method comprising:
   finding a SameAs assertion within a plurality of assertions stored in an ABox;
   identifying, with a processor, each assertion accessible to the processor within the ABox and having a first individual, but not a second individual, of the SameAs assertion as an instance;
   creating, for each of the identified assertions, a new assertion having the second individual of the SameAs assertion as an instance; and
   adding each of the created new assertion to the ABox, wherein
   one of the identified assertions is a class assertion in which the first individual is asserted to be an instance of the class,
   wherein the creating of the new assertion comprises substituting the second individual of the SameAS assertion for the first individual within a copy of the identified assertion.

2. The assertion management method of claim 1, wherein each new assertion is a Class assertion, an ObjectProperty assertion, or a DatatypeProperty assertion.

3. The assertion management method of claim 1, wherein the SameAs assertion has a format of one individual=another individual.

4. The assertion management method of claim 1, further comprising adding each new assertion to the plurality of assertions.

5. The assertion management method of claim 1, wherein the new assertion comprises a plurality of new assertions, each of which is any one of a Class assertion, an ObjectProperty assertion, and a DatatypeProperty assertion, such that the plurality of new assertions comprises only Class assertions; or only ObjectProperty assertions; or only DatatypeProperty assertions; or only at least one Class assertion and at least one ObjectProperty assertion; or only at least one Class assertion and at least one DatatypeProperty assertion; or only at least one ObjectProperty assertion and at least one DatatypeProperty assertion; or at least one Class assertion, at least one ObjectProperty assertion, and at least one DatatypeProperty assertion.

6. An assertion management apparatus comprising:
   a collector configured to find a SameAs assertion within a plurality of assertions stored in an ABox;
   a processor configured to identify each assertion accessible to the processor within the ABox and having a first individual, but not a second individual, of the SameAs assertion as an instance;
   a creator configured to create, for each of the identified assertions, a new assertion having the second individual of the SameAs assertion as an instance; and
   an adder configured to add each of the created new assertion in the ABox, wherein
   one of the identified assertions is a class assertion in which the first individual is asserted to be an instance of the class,
   wherein the creator is further configured to create a new assertion by substituting the second individual of the SameAS assertion for the first individual within a copy of the identified assertion.

7. The assertion management apparatus of claim 6, wherein each new assertion is a Class assertion, an ObjectProperty assertion, or a DatatypeProperty assertion.

8. A reasoning apparatus comprising:
- an ABox processor comprising a plurality of assertions stored in an ABox, the ABox processor being configured to:
  - find a SameAs assertion within the plurality of assertions;
  - identify, with a processor, each assertion accessible to the ABox processor within the ABox and having a first individual, but not a second individual, of the SameAs assertion as an instance;
  - create, for each identified assertion, a new assertion having the second individual of the SameAs assertion as an instance; and
  - add each new assertion to the ABox; and
- a reasoner configured to:
  - receive an assertion from the ABox processor; and
  - perform reasoning using the assertion received from the ABox processor, wherein
- one of the identified assertions is a class assertion in which the first individual is asserted to be an instance of the class,
- wherein the ABox processor is further configured to create each new assertion by substituting the second individual of the SameAs assertion for the first individual within a copy of the identified assertion.

9. The reasoning apparatus of claim 8, wherein each new assertion is a Class assertion, an ObjectProperty assertion, or a DatatypeProperty assertion.

10. A method of managing ontology, the method comprising:
- finding a relation indicating that first information and second information are different representations of the same thing in an ABox;
- identifying, with a processor, a relation accessible to the processor within the ABox that includes the first information but not the second information and identifies the first information as an instance of a class;
- creating, for the identified relation, a new relation that is the same as the identified relation, except the second information is substituted for the first information within the new relation; and
- adding the new assertion to the ABox,
- wherein the creating of the new relation comprises substituting the second information of the relation for the first information within a copy of the identified relation.

* * * * *